United States Patent
Zarian et al.

Patent Number: 5,937,127
Date of Patent: Aug. 10, 1999

[54] LINEAR LIGHT FORM WITH MULTILAYERED JACKETING

[75] Inventors: James R. Zarian, Newport Bch; Gregg S Whitaker, Del Mar; John A Robbins; Paul E Robbins, both of El Toro, all of Calif.

[73] Assignee: Lumenyte International, Inc., Irvine, Calif.

[21] Appl. No.: 08/857,550

[22] Filed: May 16, 1997

Related U.S. Application Data

[60] Provisional application No. 60/017,449, May 17, 1996.

[51] Int. Cl.$^6$ ........................................ G02B 6/02
[52] U.S. Cl. .................. 385/128; 385/102; 385/123; 362/556
[58] Field of Search .................. 385/100, 102, 385/109, 112, 126–128, 901, 123; 362/556, 551, 582

[56] References Cited

U.S. PATENT DOCUMENTS

| | | | |
|---|---|---|---|
| 4,422,719 | 12/1983 | Orcutt | 385/123 |
| 4,466,697 | 8/1984 | Daniel | 385/123 |
| 4,637,686 | 1/1987 | Iwamoto et al. | 385/128 |
| 4,732,442 | 3/1988 | Mori et al. | 362/551 |
| 4,798,445 | 1/1989 | Yamamoto et al. | 385/143 |
| 4,884,860 | 12/1989 | Brown | 385/27 |
| 5,067,831 | 11/1991 | Robbins et al. | 385/123 |
| 5,221,387 | 6/1993 | Robbins et al. | 156/85 |
| 5,293,442 | 3/1994 | Sayegh | 385/102 |
| 5,333,228 | 7/1994 | Kingstone | 385/100 |
| 5,345,531 | 9/1994 | Keplinger et al. | 385/102 |
| 5,721,795 | 2/1998 | Pelka | 385/37 |

Primary Examiner—Hemang Sanghavi
Attorney, Agent, or Firm—Small Larkin, LLP

[57] ABSTRACT

The present invention is directed to a heat shrink clad-core optical conduit surround by multiple layers of jackets and a method of manufacturing the same. The jackets are formed with a thickness and index of refraction that is preferred for generating an aura effect. The aura effect appears when light transmitted through the core appears to be traveling seamlessly through the entire core, cladding and jackets and may even appear to illuminate the space surrounding the outer most jacket, thus, producing an aura that makes the fiber optic conduit appear larger than it is. The preferred embodiment may include interlacing layers of materials that provide optical characteristics, such as dichroic and holographic films, that are enhanced by the aura effect.

10 Claims, 6 Drawing Sheets

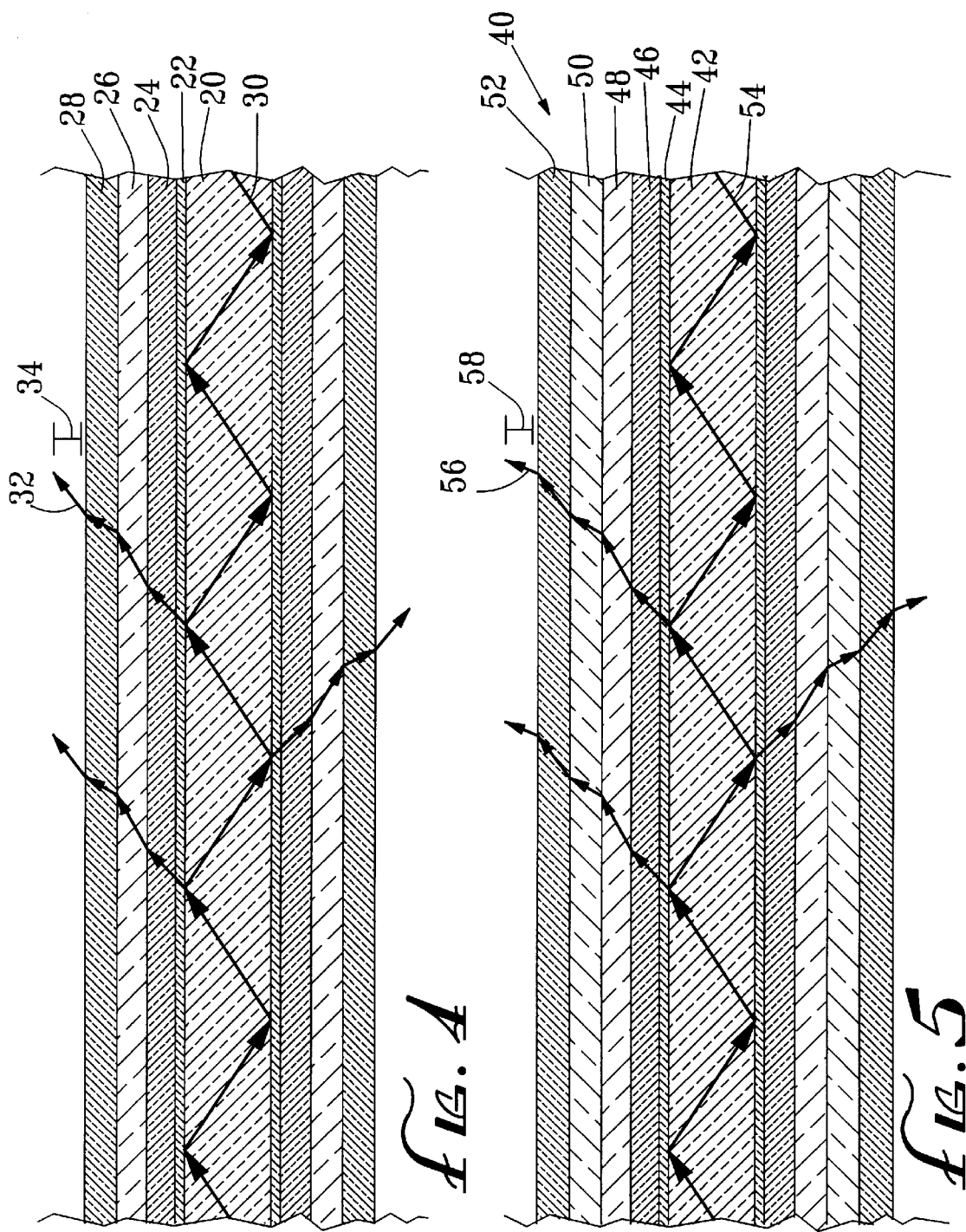

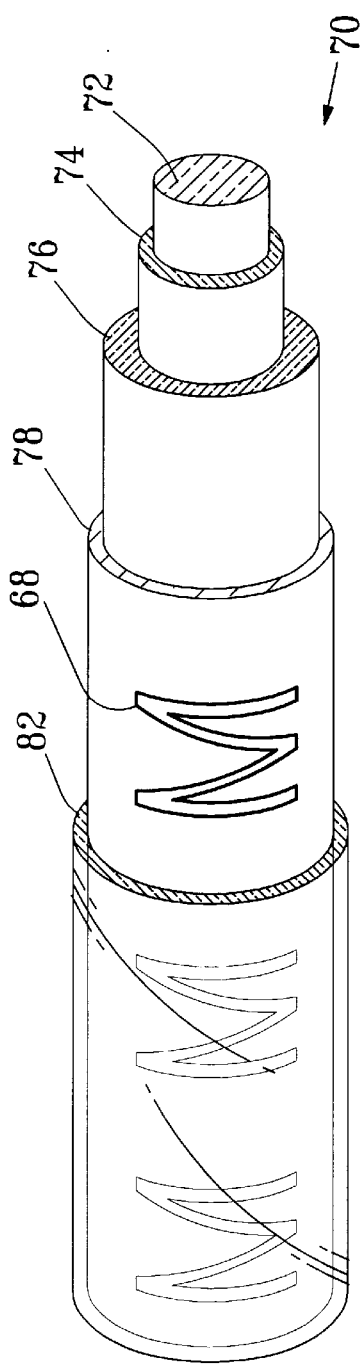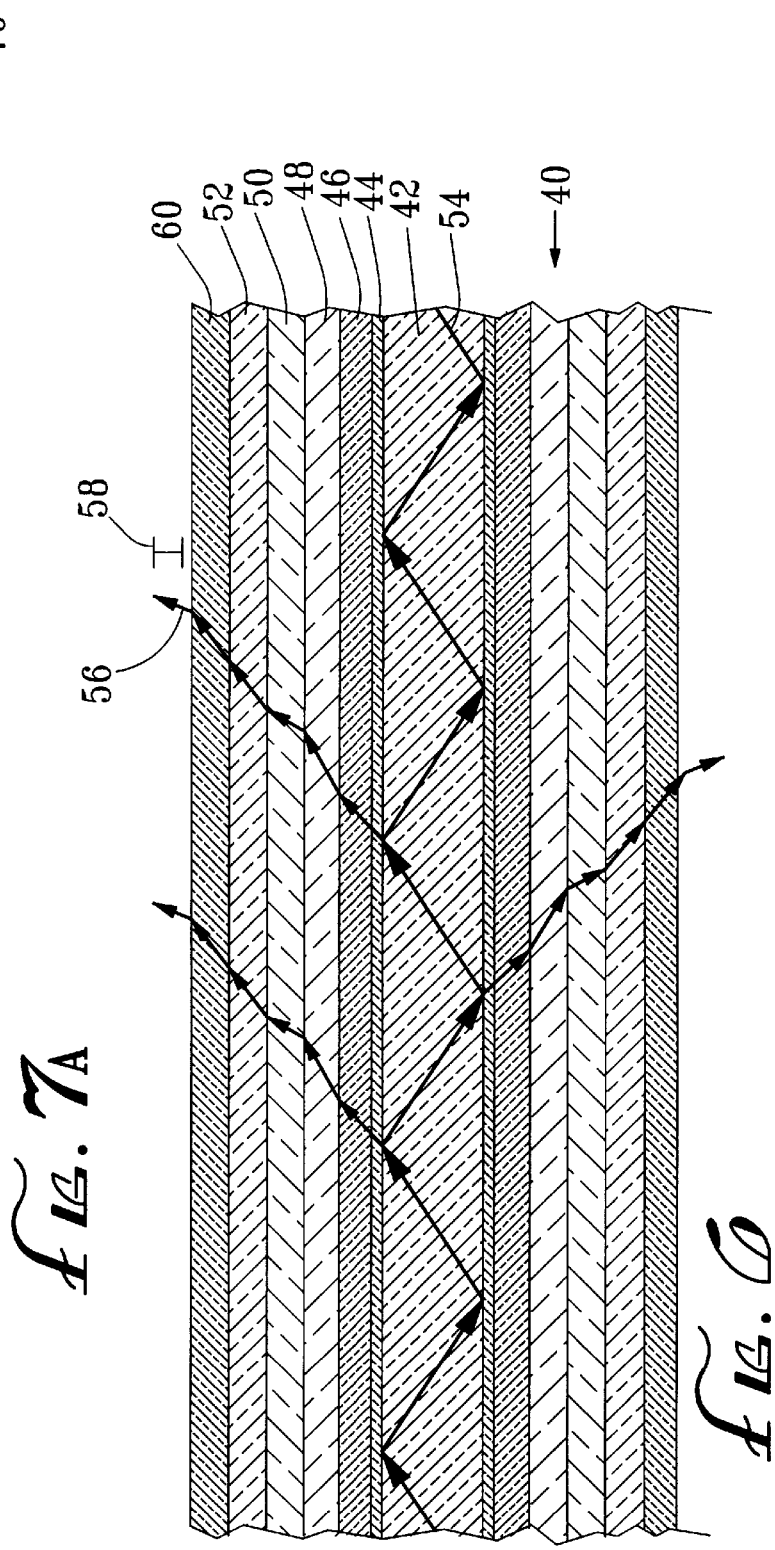

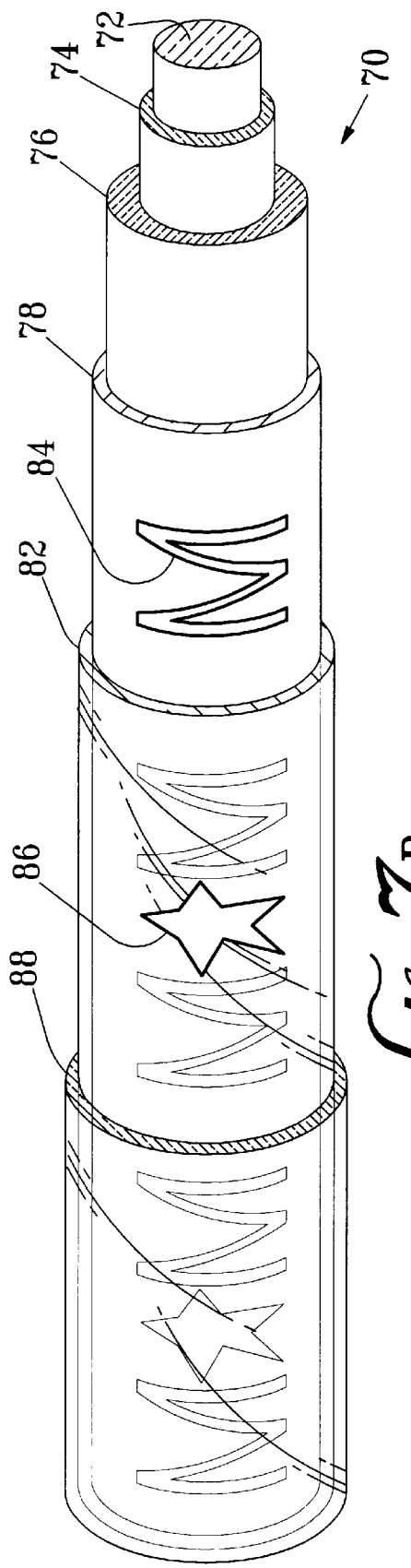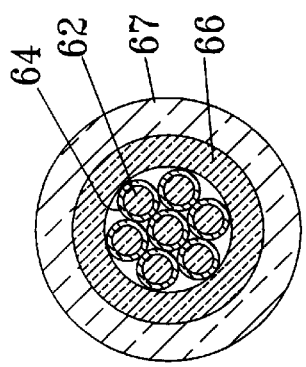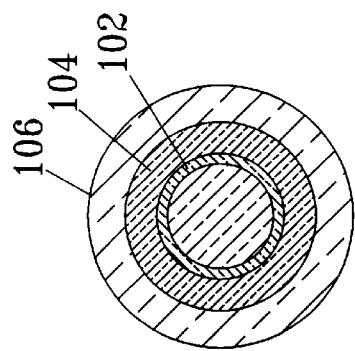

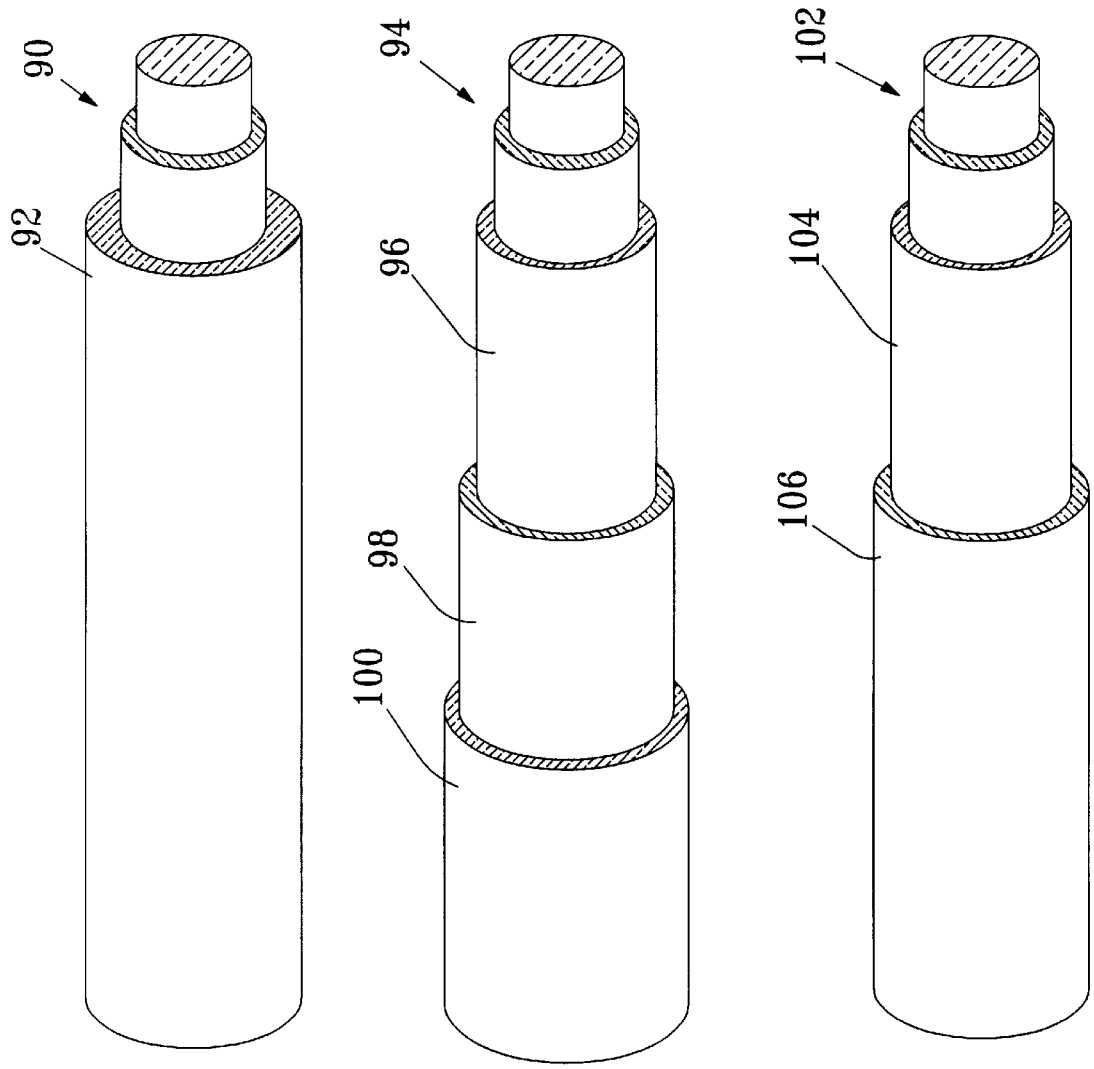

LINEAR LIGHT FORM WITH MULTILAYERED JACKETING

CROSS REFERENCES TO RELATED APPLICATIONS

This application claims the benefit of U.S. Provisional Application No. 60/017,449 filed on May 17, 1996, which is incorporated herein by reference.

BACKGROUND OF THE INVENTION

A. Field of the Invention

The present invention relates broadly to linear light forms and, more specifically, to linear light forms for use in side lighting applications, more specifically, functional lighting applications and/or decorative lighting applications. Furthermore the present invention relates to manufacturing processes for a linear light form that reduces the cost of manufacture and increases the throughput of the light form.

B. Discussion of the Prior Art

Fiber optic light conduits, which are a type of linear light form, are described in U.S. Patents, for example, U.S. Pat. Nos. 5,333,228, 4,933,815, 4,763,984, and 5,067,831 in which the fiber optic light conduit includes generally a fiber-optic core and a cladding material. The addition of a jacketing material extruded over the fiber-optic core and cladding material has been desirable in applications that: require the fiber-optic core and cladding to be protected from the environment and/or require an encasement for multiple strands, each comprised of fiber optic core and cladding material.

When used in functional and/or decorative lighting applications, linear light forms comprising a thermoset core composition are presently preferred due to the outstanding light transmission efficiency, environmental capabilities, mechanical properties and ease of use qualities. Thermoset cores are desirable for such applications because such cores can be produced in a solid form and with a single strand of core material.

Nonetheless, while suited for their intended purpose, thermoset cores with a cladding do not produce auras similar to neon lighting in which the linear light form, when propagating light appears to have a larger diameter due to the aura effect. "Aura" is defined as luminous radiation. The "aura effect" is where luminous radiation appears outside of the core and cladding, and is visible in the jacket or the jacket and the space surrounding the jacket. It is when the aura effect illuminates the space surrounding the jacket that the conduit appears to have a larger diameter. A single jacket, when applied to the core and cladding has been found to provide the desired aura effect, but the effect dissipates as the thickness of the single jacket is increased. Once the jacket exceeds the useful diameter thickness, the light form does not exhibit an aura effect, and the fiber optic appears as decoupled, i.e., contained within, but separate from, the jacketing. The optic appears to be incased in the jacket with no aura effect.

However, the demand for larger diameter linear light forms is growing. At present the cost of producing thermoset cores having a diameter generally greater than 11–15 mm is cost prohibitive. Thus the need exists for increasing the apparent diameter using the aura effect in fiber-optic lighting systems.

Additionally, linear light forms, when bent past a certain degree known as permissible "bend radius", appear to have a "hot spot'. A hot spot is defined as the area of the optic that appears to be brighter than the rest of the optic. The hot spots can detract from lighting applications wherein the uniformity of the light of the light is desirable. It is thus desirable to reduce the hot spot effect.

OBJECTS AND SUMMARY OF THE INVENTION

The general object of the present invention is to provide, in a linear light form, a fiber-optic light conduit whereby the overall illuminated diameter of the optic is maximized while the fiber optic size is minimized. An advantage of the present invention is to provide a fiber optic conduit that, as compared to prior fiber-optic conduits, exhibits a larger illuminated diameter using the aura effect, operates with conventional thermoset cores and cladding having optimized cross-sectional diameters to ensure relatively equal efficiency and energy to operate, and reduces the cost of production relative to larger dimension fiber-optic cores.

A feature of the present invention is to provide a fiber-optic conduit that comprises multiple layers of jacket materials with different optical properties onto the outer periphery of fiber optic core and cladding, to expand the perceived size of the fiber optic core and cladding (also referred to when combined as the "clad-core optic") while limiting the actual size to maintain efficiency of its manufacture.

A further object of the present invention is to provide a fiber optic conduit that, when bent, does not exhibit a hot spot relative to prior fiber optic conduits.

A further advantage of the present invention is to provide a fiber-optic conduit is illuminated generally uniformly across it length.

A further feature of the present invention is to provide a fiber-optic conduit having multiple layers of jacket material, in sufficient thickness, to reduce the hot spot effect in relation to an increase in the overall diameter of the fiber optic conduit.

An additional feature of the present invention is to provide a fiber-optic conduit having multiple layers of jacket material whereby interlacing layers of optical materials having a variety of optical characteristics and shapes may be interspersed between the layers of jacket material.

In accordance with the object, advantages and features of the invention, a fiber-optic conduit is provided comprising a thermoset, thermoplastic or liquid light transmitting core, cladded with a fluoropolymer cladding, in turn, jacketed with a transparent or translucent polymeric jacket of one refractive index, and subsequently jacketed with a transparent or translucent polymeric jacket of another refractive index whereby the refractive index of any of the adjacent layers are either higher or lower relative to each other.

In another aspect of the present invention, a fiber-optic conduit is provided comprising a thermoset, thermoplastic or liquid light transmitting core, cladded with a fluoropolymer cladding, in turn, jacketed with at least two transparent or translucent polymeric jackets. Each jacket has a wall thickness useful to produce an aura effect.

In yet another aspect of the present invention, a fiber-optic conduit is provided comprising a thermoset, thermoplastic or liquid light transmitting core, cladded with a fluoropolymer cladding, in turn, jacketed with multiple layers of transparent or translucent polymeric jackets of one refractive index or another, whereby the refractive index of any of the adjacent layers are different from one another.

In yet another aspect of the invention, a linear light form is provided consisting of a plurality of light transmitting cores, each cladded with a fluoropolymer cladding and jacketed with multiples of transparent or translucent polymeric jackets of one refractive index or another, whereby the refractive index of any of the adjacent layers are different from one another.

In yet another aspect of the invention, a fiber-optic conduit is provided comprising a thermoset, thermoplastic or liquid light transmitting core, cladded with a fluoropolymer, in turn, jacketed with a transparent or translucent polymeric jacket of one refractive index, a layer having an optical characteristic, for example a hologram, surrounding the polymer jacket, and subsequently jacketed with a transparent or translucent polymeric jacket of another refractive index whereby the refractive index of any of the adjacent layers are either higher or lower. Other linear light forms of the same arrangement are desired where the layer having the optical characteristic comprises other "active optic elements" such as reflectors, reflective particles, dichroics, tapes, designs, letterings and the like.

Preferably, the multi-layer jacketed linear light forms of the present invention exhibit a larger appearance with a higher uniformity (seamlessness) than if a single layer of a polymer jacket was applied. Further, the multi-layer jacketed linear light forms of the present invention exhibits no or minimized hot spot(s) when bent beyond the permissible bend radius in addition to appearing seamless. In other words, such an optic when illuminated and bent does not exhibit a hot spot as pronounced with a bare optic.

In yet another aspect of the present invention, a fiber-optic conduit having a clad-core optic cross-sectional diameter smaller than that desired for the final application is manufactured first, and next multiple layers of jacketing material are applied to obtain optics that appear larger. Given that most of the expense of manufacturing the linear light forms is associated with the manufacture of the clad-core optic and jacketing materials are, on the other hand, relatively inexpensive by comparison, the cost of manufacturing relatively large diameter fiber optic conduits is reduced.

BRIEF DESCRIPTION OF THE DRAWINGS

Other objects, advantages, and features of the invention will become apparent from the foregoing detailed description taken in connection with the accompanying drawings, in which:

FIG. 4 is a cross-sectional side view of the fiber optic conduit of FIG. 1;

FIG. 5 is a cross-sectional side view of the fiber optic conduit of FIG. 2;

FIG. 6 is a cross-sectional side view of the fiber optic conduit of FIG. 3;

FIG. 7a is a segmented, partial perspective view of a fiber optic conduit having an interlacing lager;

FIG. 7b is a segmented, partial perspective view of a fiber optic conduit having a pair of interlacing layers;

FIG. 8 is a transverse, cross-sectional view of the present invention having a clad-core optic surrounded by a pair of jackets;

FIG. 9 is a transverse, cross-sectional view of an optical fiber conduit having multiple clad core strads surrounded by a pair of jackets;

FIG. 10a is a segmented partial perspective view of a fiber optic conduit having a single jacket;

FIG. 10b is a segmented partial perspective view of a fiber optic conduit having multiple jackets;

FIG. 11 is a segmented partial perspective view of a fiber optic conduit having multiple jackets;

DESCRIPTION OF THE PREFERRED EMBODIMENT(S)

Figure 1:
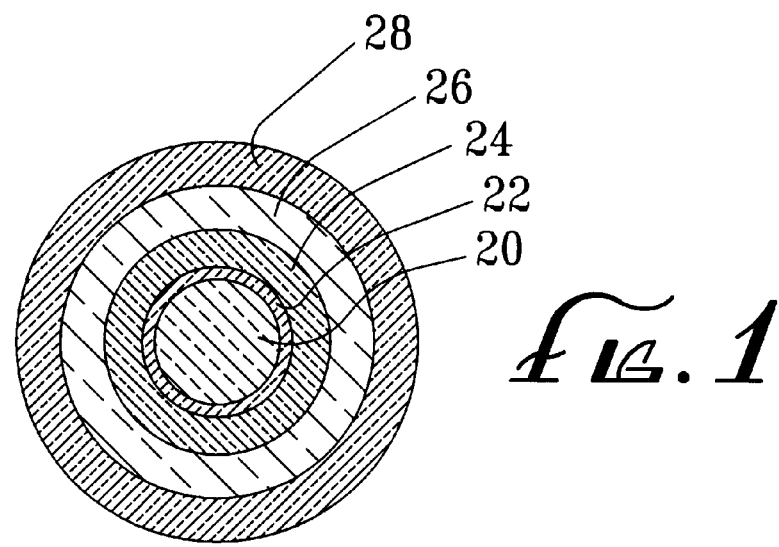
FIG. 1 is a transverse, cross-sectional view of a fiber optic conduit of the present invention having a clad-core optic surrounded by a pair of jackets separated by a layer having an optical characteristic.

As shown in FIGS. 1 and 4 for purposes of illustration, a fiber-optic conduit of the present invention includes generally a light transmitting polymeric core 20, cladded with a fluoropolymer cladding, such as Teflon® FEP™ 22 which without additional layering, would form a conventional clad-core optic. A conventional clad-core optic of the type suitable for the present invention is manufactured by Lumenyte International Corporation, Costa Mesa, Calif. U.S.A. under model No. Lumenyte 2000™. The clad-core optic is surrounded by a first jacket 24 having a wall thickness desirable and sufficient to produce an aura effect. A fiber optic conduit of this configuration is disclosed in U.S. Pat. No. 5,067,831 (hereinafter the "'831" patent) which is incorporated herein by reference. Example 18 as disclosed in the '831 patent produced an aura effect in a single jacket fiber-optic conduit having a jacket wall thickness of generally 1.5 mm. The first jacket 24 includes a higher or lower refractive index than the cladding formed about the core. An interlacing layer 26 having an optical characteristic, for example a film having a holographic image recorded thereon, is desirably applied about the outer surface of the first jacket 24. The interlacing layer 26 is preferably a thin film which can be formed either continuously along the length of the fiber-optic conduit or at discrete intervals. The thickness of the interlacing layer 26 illustrated in FIGS. 1 and 4 is to illustrate the placement of the layer and not to illustrate the relative thickness of the interlacing layer 26 in relation to the clad-core optic 20 and 22 and jackets 24.

Subsequently, a second jacket 28, having a wall thickness desirable and sufficient to produce an aura effect, is formed over the interlacing layer 26. Advantageously, the second jacket 28 has a higher or lower refractive index than the first jacket 24. When light 30 (FIG. 4) is transmitted through core 20, the first jacket 24 and second jacket 28 combine to produce an aura effect to cause the fiber-optic conduit to appear larger than it actually is. As illustrated in FIG. 4, light is transmitted through the core 20 of the conduit as is shown by line 30. Light shown by line 32 that contributes to the aura effect is transmitted through the first jacket 24 and second jacket 28 and projects out of the conduit to partially illuminate the space 34 surrounding the conduit. The result of this combination of jackets (FIGS. 1 and 4) is that the wall thickness of the first jacket 24 and of the second jacket 28 may be greater than the maximum wall thickness capable of producing an aura effect in a fiber-optic conduit having a single jacket. A further advantage, is that the optical characteristic in the interlaced layer 26 may be affected by the aura effect. Optical characteristic is any material that affects the propagation, reflection, refraction, interference, diffraction, and polarization of light within the visible spectrum. In the example of the interlacing layer having an optical characteristic of a holographic image, the holographic image produces a three dimensional image that appears to have greater depth when illuminated by the aura effect.

The process of applying the jacket and interlacing layers can be done in a continuous manner such as co-extrusion using multiple extruders and pay-offs or in a static manner such as wrapping the optic, deposition onto the optic, printing onto one of the jackets, and the like. The extrusion process can be co-extrusion or tandem extrusion.

Clad-core optics which are useful for the present invention can also include, but are not limited to, light forms composed of: a thermoset light transmitting core cladded by a fluoropolymer cladding, a plurality of thermoset light transmitting cores each cladded by a fluoropolymer cladding, a thermoplastic light transmitting core cladded by a fluoropolymer cladding, a plurality of thermoplastic light transmitting cores each cladded by a fluoropolymer cladding, a reflective or refractive linear configuration intertwined within a plurality of light transmitting cores each cladded by a fluoropolymer cladding.

Suitable materials for the jackets of the present invention can include, but are not limited to polymers including: poly(vinyl chloride), polyacrylates, polymethacrylates, polycarbonates, silicones, butyrates and polyolefins among other commercially available common polymers, either in thermoplastic or thermoset forms.

It has been found that increasing the apparent illuminated diameter produced by the aura effect in the fiber optic conduit is achieved through multiple jackets in which the refractive index between various jacket layers is varied. Fillers, inclusions, or other materials that can beneficially be combined with the above listed jacket materials to alter the refractive index of the same material can include but are not limited to: optical brighteners, pigments, transparent or translucent colorations, microstructures, plasticizers, UV absorbers or combinations of and the like.

The interlacing layer interposed between multiple layers of jackets desirably comprises an optical characteristic that is affected by the aura effect. Optical characteristics that are particularly beneficial for such an application can include but, are not limited to: reflective films, refractive films and/or dichroic films including holograms. Desirable dichroic films of the type that exhibit a mirror or light diverting effect may include: films that have a reflective or refractive surface; dichroic materials that divert light in a certain angle; dichroic materials that may advantageously filter out some frequencies while allowing other frequencies to pass through, for example polarized films; holograms specifically designed to project an image; refractive materials capable of refracting light in a desired direction; and reflective materials placed at intervals onto the linear light.

The refractive indices of useful polymeric fiber optic cores are in the range of 1.489 for poly(methyl methacrylate) to 1.592 for the poly(styrene). The refractive indices useful for claddings are 1.34 for fluorinated polyethylene propylene (Teflon FEP™) and higher for other flouropolymers. Typically, the cladding is selected to have a lower refractive index then the core of at least 0.01 difference. The higher difference the better for illumination step-index optics. For example, for Lumenyte type optics, the difference between the core and the cladding is (1.51 less 1.34) approximately a 0.17 difference.

For purposes of the present invention, the preferred difference in the index of refraction between any two layers is 0.21 (for example, 1.55 for poly (vinyl chloride) less 1.34 for Teflon FEP™). Of course, the higher the difference in the index of refraction between the multiple layers of jackets the better; therefore, the preferred difference is generally 0.21 as disclosed in one of the samples (THV extruded onto PVC). The lowest useful difference in the index of refraction between layers is 0.001. A good difference in the index of refraction between layers is 0.01.

It should be noted that while the interlacing layer is desirable in many of the linear light applications, the interlacing layer is not necessary to produce the aura effect. Rather, the addition of layers of jackets, where each jacket has a different index of refraction relative to the adjacent jacket and/or cladding and a useful wall thickness, increases the illuminated diameter of the optic produced by the aura effect. The wall thickness can vary in relation to the number of layers and in relation to the index of refraction; however, the wall thickness of each jacket should be determined independently such that it is sufficiently thin to maximize the aura effect. For example, experiments with single PVC jackets having a wall thickness of 5.7 mm did not produce an aura effect.

Figure 2:
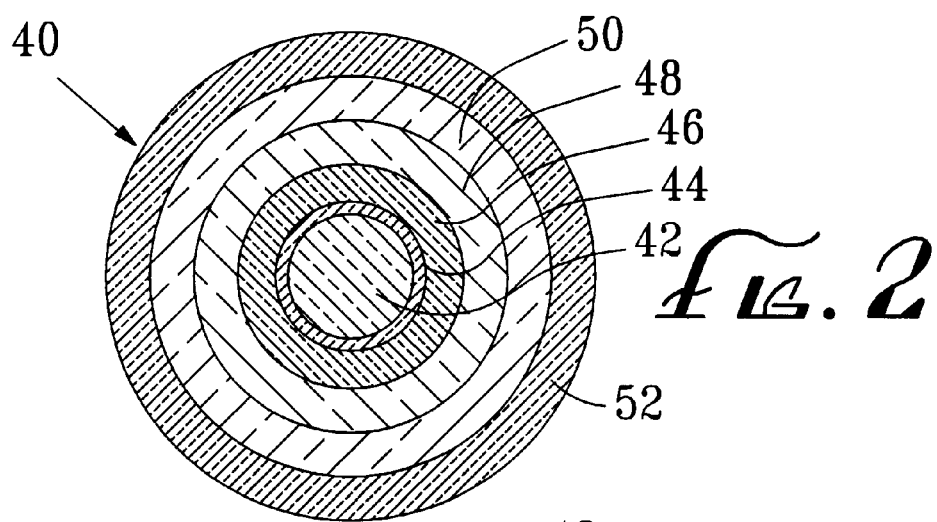
FIG. 2 is a transverse, cross-sectional view of a fiber optic conduit of the present invention having a clad-core optic surrounded by multiple jackets separated by a layer having an optical characteristic.

Additional jackets may be combined in layers to produce the aura effect in fiber optic conduits having a combined jacket wall thickness significantly greater than was possible using a single jacket. A fiber-optic conduit 40, as illustrated in FIGS. 2 and 5, includes a core 42 surrounded by a cladding 44 and a first jacket 46, formed from materials having an index of refraction different from the cladding 44. An interlacing layer 48 surrounds the first jacket 46. A second jacket 50, formed from materials having an index of refraction different from the first jacket 46, surrounds the interlacing layer 48. A third jacket 52, formed from materials having an index of refraction different from the second jacket 50, surrounds the second jacket. Light, illustrated in FIG. 5 by line 54 is transmitted through the core 42. Light, illustrated in FIG. 5 by line 56 and representative of the aura effect, is transmitted out of the core 42 through the cladding 44 and other jackets and interlacing layers 56–52 to illuminate the space 58 surrounding the outer or third jacket. The overall transverse-cross-sectional diameter of the this aura producing conduit is larger than the maximum diameter of a fiber-optic conduit having only two jackets. Furthermore, the illuminated diameter produced by the aura effect is larger.

Figure 3:
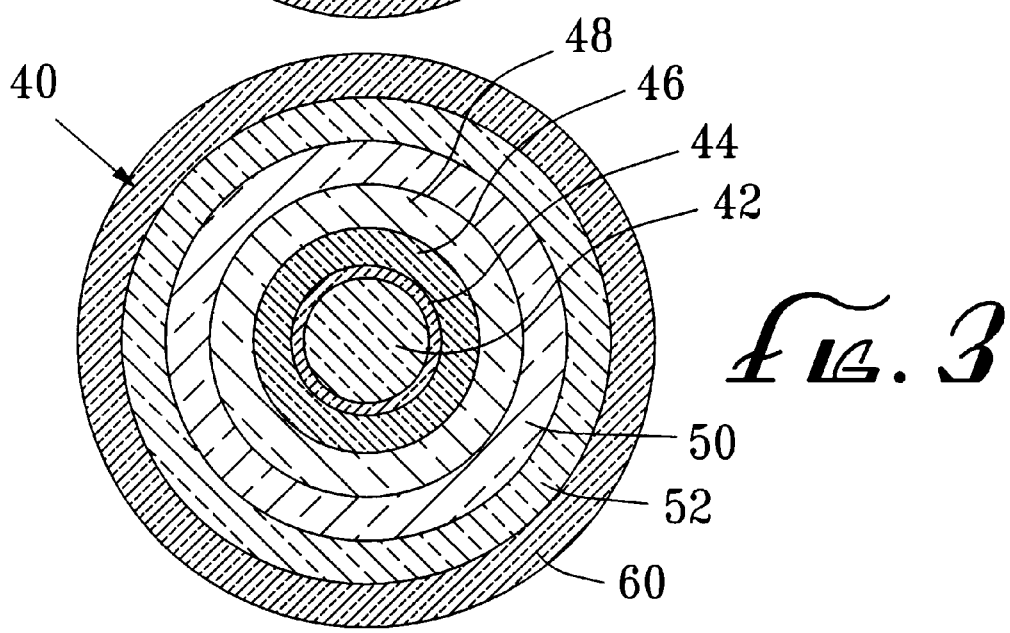
FIG. 3 is a transverse, cross-sectional view of a fiber optic conduit of the present invention having a clad-core optic surrounded multiple of jackets separated by a layer having an optical characteristic.
Figure 12:
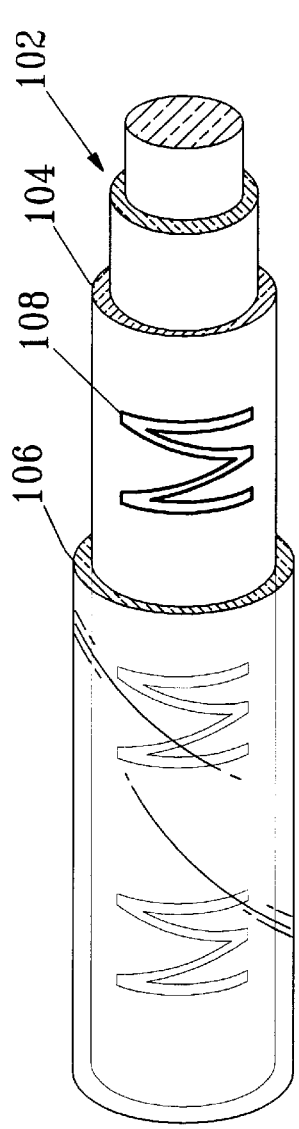
FIG. 12 is a segmented partial perspective view of a fiber optic conduit having multiple jackets.

The aura effect has been produced in conduits comprising at least 3 to 4 jackets. The fiber-optic conduit, illustrated by FIGS. 2 and 5, may be increased in transverse, cross-sectional diameter size by adding a fourth jacket layer 60, illustrated by FIGS. 3 and 6, and formed from materials having a different index of refraction from the third layer 52. Again the size of the fiber optic conduit 40 is increased, while maintaining the aura effect of light 56 projected to illuminate the space 58 surrounding the fourth jacket.

An interlacing layer 68 (FIG. 7A) comprising a film with discrete holographic images (or three-dimensional images) may be inserted in a fiber optic conduit 70 having a core 72, cladding 74 and three jacket layers 76, 78 and 82. The holographic film 68 when inserted between the second jacket 78 and third jacket 82 layers is amplified by the aura effect thus giving the appearance that the image projects out of the conduit 70 when illuminated. With reference to FIG. 7b, the same effect can be further amplified by providing a first holographic image film 84 between the second jacket 78 and third jacket 82 and a second holographic image film 86 between the third jacket 82 and a fourth jacket 88. The combination of different holograms 84 and 86 at different layers results in a greater appearance of three-dimensional depth when the 3-D effect is amplified by the aura effect.

With reference to FIG. 9, an alternative embodiment of a fiber-optic conduit includes a plurality of light transmitting cores 62, each cladded with a fluoropolymer cladding 64 and collectively jacketed with a transparent or translucent polymeric jacket 66 of one refractive index, and subsequently jacketed with a transparent or translucent polymeric jacket 67 of another refractive index whereby the refractive index of any of the adjacent layers are either higher or lower.

Manufacturing of the fiber-optic conduit having multiple jacket layers preferably includes first the step of selecting a clad-core optic having cross-sectional diameter smaller than that desired for the final application then multiple layers of jacketing material, formed with a thickness and optical properties sufficient to produce the aura effect, are applied to obtain optics that when illuminated appear to have a larger diameter produced by the aura effect.

The processes which are desired for manufacturing the multiple-jacketed conduit can include, but are not limited to co-extrusion of the jacketing layers by multiple extruders through multiple cross-head tooling while applying the interlaced layer, cross-head extrusion of the first jacketing, applying the interlaced layer and cross-head extruding the second jacketing and again cross-head extruding another jacketing with a different refractive index; or application of the first jacket by spray-up, wrapping, heat shrinking among other methods, applying the interlaced layer, applying second, third or more jacketing by cross-head extrusion or other similar methods.

Multiple Jacket Conduit Examples

Comparative Example of Two Fiber Optic Conduits Having Generally the Same Overall Transverse, Cross-Sectional Diameter A Single Jacketed Fiber-Optic Conduit (Does Not Produce Aura Effect)

A length (about 5 meter) of clad-core optic 90 of the type sold under model no. WN-500 manufactured by Lumenyte International Corporation, Costa Mesa, Calif., USA was selected (FIG. 10a). The clad-core optic had a transverse, cross-sectional diameter of generally 14 mm. The refractive index of the core is generally 1.49 and the refractive index of the cladding is generally 1.34 for this type of clad-core optic. Onto this clad-core optic was extruded a transparent polyvinyl chloride jacketing 92 having a refractive index of approximately 1.48. The jacket 92 was formed from resin supplied by AlphaGary of Charlotte, N.C. and sold as model no. PVC 346/XF-95 clear 0002. The jacket 92 was formed with a wall thickness of approximately 5.7 mm using cross-head extrusion tooling manufactured by GENCO of Ft. Lauderdale, Fla. and a 50 cm diameter extruder manufactured by WELEX of Blue Bell, Pa. The jacketed linear light form, when illuminated, appeared to be an optic encased in a thick jacketing; the optic 90 appeared decoupled from the jacket 92, did not produce an aura effect, and the diameter of the illuminated portion of the fiber optic conduit appeared to be the same as that of the unjacketed optic. When bent the hot spot at the bend was easily observed. There was no observable aura effect.

A Multiple Jacket Fiber-Optic Conduit

An approximate length of 5 meters of the same type of clad-core optic 94 (FIG. 10b), noted above, was first jacketed with a first jacket 96 having the same transparent polyvinyl chloride material with a wall thickness of approximately 2.0 mm. Next, a second jacket 98 formed from material sold under model no. THV 200 G, a fluoropolymer product of Dyneon of St. Paul, Minn., USA with a reported lower refractive index of 1.34, was extruded over the first jacket with a wall thickness of approximately 1.7 mm. Finally, a third jacket 100 of the same transparent PVC material as used for the first jacket 96, with a wall thickness of approximately 2.0 mm, was extruded over the second jacket 98 to create an overall outside, transverse, cross-sectional wall thickness of generally 5.7 mm, approximating the comparative single jacket conduit above. When the multi-layer jacketed linear light form, with a relatively higher refractive index jacketing 96, co-extruded with a lower refractive index jacketing 98 and again co-extruded with a higher refractive index jacketing 100, was illuminated, the illuminated portion of the linear light form appeared as large as the overall diameter and the optic inside did not appear to be decoupled compared to the linear light form above. The aura effect was produced using an overall jacket wall thickness equal to the single-jacketed conduit (FIG. 10a) that did not produce an aura effect. When the linear light form (FIG. 10b) was bent acutely, a hot spot as severe as the single-jacketed conduit (FIG. 10a) was not observed.

Multiple PVC Jackets with Different Indices of Refraction

EXAMPLE 1

A length of about 5 meters of clad-core optic 102 (FIGS. 8 and 11) having a transverse, cross-sectional diameter of generally 7 mm of the type sold under model no. WN-200 manufactured by Lumenyte International Corporation, Costa Mesa, Calif., USA was selected. The clad-core optic 102 has the same refractive index properties as the clad-optic of the comparative example. Onto the clad-core optic 102 was extruded a translucent polyvinyl chloride jacketing material or first jacket 104. The translucent polyvinyl chloride jacket was prepared by addition of less than 1% general purpose white pigment concentrate to transparent AlphaGary PVC 346/XF-95 clear 0002 with a wall thickness of about 1.5 mm. The extrusion process was completed using a GENCO cross-head tooling and a 50 cm WELEX extruder. Onto the resulting clad-core optic having a first jacket 104 and utilizing the same tooling and extruder, a second jacket 106, formed from the same material without pigmentation (clear) to effectuate a different refractive index, was extruded with a wall thickness of 1.5 mm. When the arrangement was illuminated using an illuminator sold under model no. QL-60 manufactured by Lumenyte International Corp. (not shown), the resulting multi-layer jacketed linear light form appeared very uniform and approximately as large as a 10–12 mm linear light form using the produced aura effect. The inclusion of the fiber optic within this jacketed linear light form appeared seamless. Seamless means the clad-core optic appeared as fused to the jacketing without any separation. Additionally, since the same base material (polyvinyl chloride) was used for both jackets, and the refractive index of the first layer 104 was altered by inclusion of the white pigmentation only, the two jacketing layers 104 and 106 fused together by the heat of the extrusion resulting in a more integrated and uniform linear light form.

Multiple PVC Jackets with Different Indices of Refraction Having an Interlacing Layer

EXAMPLE 2 (FIG. 12)

Example 1 was repeated except that a magic marker was used to create an interlacing layer 108 formed by the ink from the marker drawn onto the white jacketing prior to the application of the clear jacketing. The writing appeared to be on the outer surface using the aura effect and the resulting multi-layer jacketed fiber optic appeared very uniform and approximately as large as a 10–12 mm linear light form.

Multiple Jacket Conduit Using Jackets Formed from Different Materials

EXAMPLE 3

Figure 13:
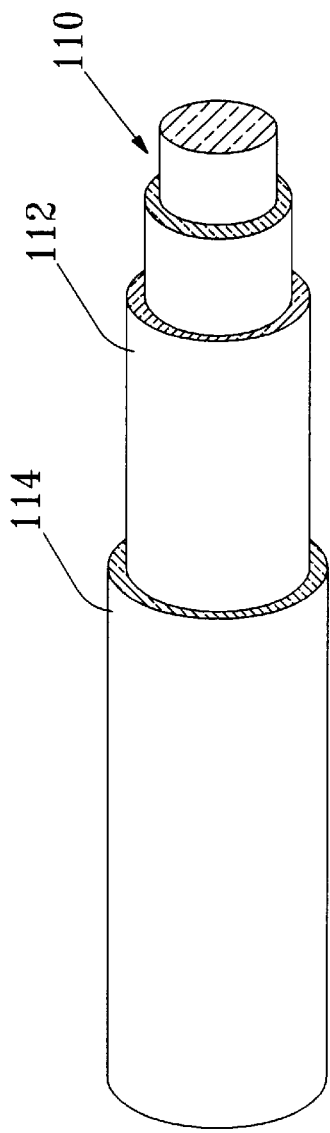
FIG. 13 is a segmented partial perspective view of a fiber optic conduit having multiple jackets.

A multi-layer jacketed linear light form (FIG. 13) was prepared by first, jacketing a length, approximately 10 meters, of a clad-core optic 110 of the type sold under model no. SWN-500 manufactured by Lumenyte International Corporation with a first jacket 112 formed from materials of the type sold by AlphaGary under model no. PVC 346/XF-95 clear 0002. The first jacket 112 had a wall thickness. 2.1 mm and refractive index P1. Next a second jacket 114 formed from materials of the type sold by Dyneon under model no. THV 500 G, was co-extruded onto the configuration. The second jacket 114 had a wall thickness 1.6 mm and refractive index P2. The arrangement when illuminated, appeared seamless, large in diameter and produced the aura effect. It is noted that P1 has a higher index of refraction value than P2.

Multiple Jacket Conduits Using Four Jacket Layers

EXAMPLE 4

Figure 14:
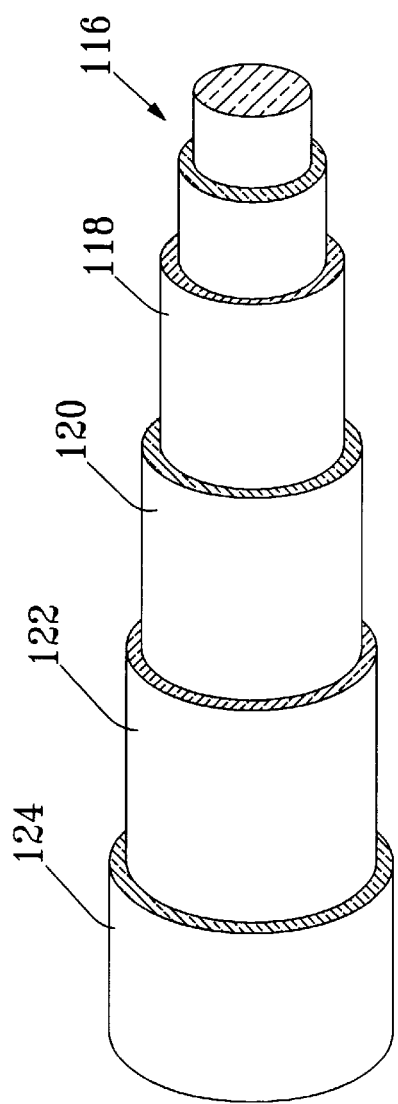
FIG. 14 is a segmented partial perspective view of a fiber optic conduit having multiple jackets.

A multi-layer jacketed linear light form (FIG. 14) was prepared by first, jacketing a length of approximately 10 meters of a clad-core 116 of the type sold under model no. SWN-500 by Lumenyte International Corporation with a first jacket 118 formed from materials of the type sold by AlphaGary under model no. PVC 346/XF-95 clear 0002. The first jacket 118 had a wall thickness 2.1 mm and refractive index P1. Next a second jacket 120 formed from materials of the type sold by Dyneon under model no. THV 500 G chloride and having wall thickness 1.6 mm and refractive index P2, was co-extruded onto the first jacket. Next, a third jacket 122, formed from material of the type sold by AlphaGary under model no. PVC 346/XF-95 clear 0002 and having a wall thickness 2.0 mm and refractive index P1, was co-extruded onto the second jacket 120. Finally, the clad-core optic, surround by three extruded jackets 118, 120 and 122, was inserted tightly into a fourth jacket 124, formed from material of the type sold by General Electric Corp. of Waterburg, N.Y. under model no. transparent GE 96606 silicone tubing and having a wall thickness 1.5 mm and refractive index P3. When illuminated, the linear light form appeared seamless and produced a larger illuminated diameter using the aura effect. It is noted that P3 has the highest index of refraction value, while P2 has a lowest index of refraction value and P1 has an index of refraction value in between P3 and P2.

While the present invention has been described in connection with what are presently considered to be the most practical and preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

What is claimed is:

1. A side light emitting linear light form comprising:
    a light transmitting thermoset core;
    a light transparent or translucent cladding surrounding said core;
    a first light transparent or translucent polymeric jacket having a first refractive index and surrounding said cladding;
    a second light transparent or translucent jacket having a second refractive index different from said first jacket and surrounding said first jacket;
    each of said first jacket and said second jacket formed with a wall thickness adapted to provide an apparent transverse-cross-sectional diameter greater than the actual transverse-cross-sectional diameter when light is transmitted through said core.

2. The linear light form of claim 1 wherein:
    said first and second jackets are further adapted to exhibit a reduced hot spot effect when bent, relative to the hot spot effect of conduits consisting of said core and said cladding.

3. The linear light form of claim 1 wherein:
    an interlacing layer is included between said first jacket and said second jacket; and
    said interlacing layer including at least one of a variety of optical characteristics.

4. A side light emitting linear light form comprising:
    a thermoset, light transmitting core, cladded with;
    a fluoropolymer cladding, in turn, jacketed with;
    a translucent polymeric jacket of one refractive index, and subsequently jacketed with;
    a translucent polymeric jacket of another refractive index; and
    whereby the refractive index of any of the adjacent jackets and cladding are different relative to each other.

5. A side light emitting linear light form is provided comprising:
    a thermoset, thermoplastic or liquid light transmitting core, cladded with;
    a light transparent or translucent fluoropolymer cladding, in turn, jacketed with;
    at least two translucent polymeric jackets, the combined thickness of each of said jackets adapted to provide an apparent transverse-cross-sectional diameter greater than the actual transverse-cross-sectional diameter of the linear light form.

6. A side light emitting linear light form comprising:
    a light transmitting core, cladded with;
    a light transmitting or translucent fluoropolymer cladding, in turn, jacketed with;
    at least two layers of translucent polymeric jackets each having a predetermined refractive index different than the refractive index of any adjacent layers.

7. A side light emitting linear light form comprising:
    a plurality of thermoset light transmitting cores, each of said cores cladded with;
    a fluoropolymer cladding and collectively jacketed with;
    a translucent polymeric jacket of one refractive index, and subsequently jacketed with; and
    a transparent or translucent polymeric jacket of another refractive index.

8. A side light emitting linear light form comprising:

a plurality of light transmitting cores;

each of said cores cladded with a fluoropolymer cladding and collectively jacketed with at least two translucent polymeric jackets, each of said jackets having a predetermined, different refractive index.

9. A side light emitting fiber-optic conduit comprising:

a thermoset, light transmitting core, cladded with;

a fluoropolymer, in turn, jacketed with;

a first translucent polymeric jacket of one refractive index;

an interlacing layer having a predetermined optical characteristic surrounding said first jacket, and a second translucent polymeric jacket of a different refractive index.

10. A method of manufacturing a side light emitting linear light form having multiple light transparent or translucent jackets comprising:

forming a light transmitting, thermoset fiber optic core;

extruding a cladding over said fiber optic core;

extruding at least two layers of light transparent or translucent jacketing material over said core and cladding; and controlling the thickness of each of said layers of jacketing material such that when illuminated, said linear light form has an apparent transverse-cross-sectional diameter greater than the actual transverse-cross-sectional diameter of the linear light form.

* * * * *